M. F. KELLY.
PIPE COUPLING.
APPLICATION FILED AUG. 3, 1908.

938,425.

Patented Oct. 26, 1909.

WITNESSES
W. W. Swartz
R. A. Balderson

INVENTOR
M. F. Kelly,
by Bakewell, Byrnes Parmelee,
his Attys.

UNITED STATES PATENT OFFICE.

MATHEW F. KELLY, OF McKEESPORT, PENNSYLVANIA, ASSIGNOR TO NATIONAL TUBE COMPANY, OF PITTSBURG, PENNSYLVANIA, A CORPORATION OF NEW JERSEY.

PIPE-COUPLING.

938,425.  Specification of Letters Patent.  Patented Oct. 26, 1909.

Application filed August 3, 1908. Serial No. 446,754.

*To all whom it may concern:*

Be it known that I, MATHEW F. KELLY, of McKeesport, Allegheny county, Pennsylvania, have invented certain new and useful Improvements in Pipe-Couplings, of which the following is a full, clear, and exact description, reference being had to the accompanying drawings, forming part of this specification, in which—

Figure 1:
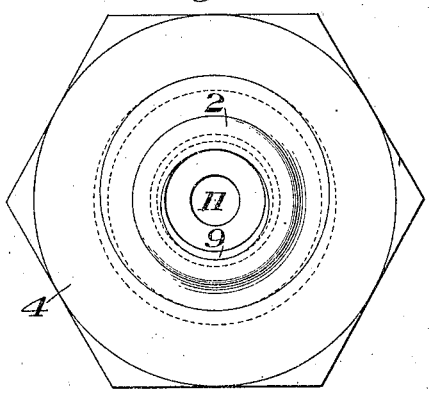
Figure 2:
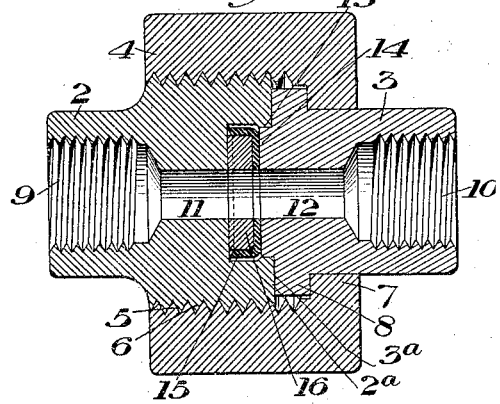
Figure 3:
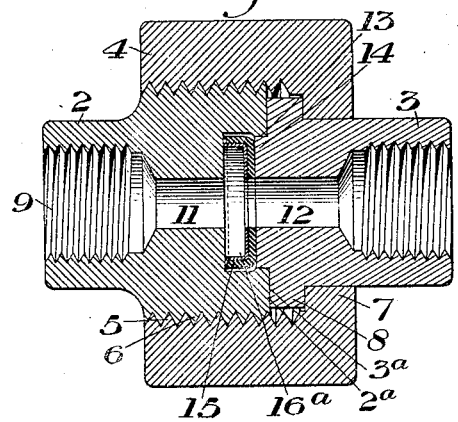

Figure 1 is an end elevation of a pipe coupling constructed in accordance with my invention; Fig. 2 is a longitudinal cross-section of the coupling shown in Fig. 1; Fig. 3 is a similar cross-section showing a modified form of coupling.

My invention relates to pipe couplings or unions adapted for use with fluid pressure piping and more particularly for use in making connections on hydraulic piping carrying very high pressures in locations where it is frequently necessary to break the joints formed by the couplings. The contacting faces of the two connecting members of such pipe couplings as constructed heretofore have been constructed one with an annular projection which fits into a registering recess located in the face of the opposite coupling member, and in some cases a thin flat gasket has been inserted between the opposing faces of the coupling. In other cases the faces of the opposing members have been plane surfaces, a gasket being used or not, as desired. The contacting faces have been drawn into engagement with each other by means of the connecting ring forming the third member of the couplings. In such couplings the opposing faces of the members must be drawn up squarely and the tightness of the joint depends entirely upon the accuracy of the fit between the faces and how tightly the members are drawn together. In such couplings great difficulty has been experienced in making tight joints, especially when used on hydraulic piping, owing to the pressure itself and also to the excessive pressure in the hydraulic piping caused by "water-hammer" and other shocks met with in the use of such piping, and when gaskets are employed the compressibility of such gaskets determines and limits the tightness of the joint.

The object of the invention is to provide an improved pipe coupling or union which will maintain a tight joint under the severe shocks to which it is subjected when used with such piping and which will permit of its being frequently connected and disconnected without damaging the contacting faces of the coupling members or impairing the efficiency of the joint made by the coupling.

The invention consists in improved means for making tight joints between the opposing faces of the coupling members and means for maintaining such joint-making devices in place in the coupling and for preventing such devices from becoming dislodged or displaced.

In the drawing, 2 represents one of the detachable members forming the coupling and 3 its opposing member which are secured together in place by means of the connecting ring 4 in connecting the ends of two pipes. The ring 4 is provided with internal threads 5 which engage with the external threads 6 on the outside of the coupling-member 2. The ring 4 is also provided with the shoulder 7 which engages with the peripheral shoulder 8 provided on the coupling member 3. The coupling members 2 and 3 have internal screw threads 9 and 10 into which the threaded ends of the pipes to be connected are secured, the shoulder 7 on the ring 4 engaging with the shoulder 8 on the member 3 so as to permit the ring to be turned freely and be screwed on the external threaded member 2. The members 2 and 3 are provided with registering axial openings 11 and 12 for the passage of the fluid and the member 2 is provided with a recess 13 into which the projection 14 on the member 3 projects when the parts of the coupling are assembled in place, the joint being made between the plane faces 2ª and 3ª on the members 2 and 3. Preferably the recess 13 is counterbored so as to be larger at its inner end than at its mouth and a cup-washer 15 made of leather or other compressible material is inserted in place in the recess. The flange or rim of the cup-washer 15 is arranged to be expanded by the pressure of the fluid in the pipes when the coupling is assembled and in this way maintain a pressure-tight joint between the members of the coupling. It will be understood that the engaging faces of the coupling members 2 and 3 also assist in maintaining a tight joint. In order to prevent collapsing of the cup-washer 15 when the coupling is disconnected or when the pressure is off the piping, an annular ring 16 is inserted in the cup-washer before the cup-washer is put into place in the recess in the coupling member 2.

In the modification shown in Fig. 3, the parts are the same except that instead of using an annular ring 16 of rectangular cross section as in Fig. 1, a flanged metal cup 16ª is employed to hold the cup-washer 15 in place in the recess 13.

In the assembling of the parts forming the couplings, the parts are connected together in the usual manner. Before bringing the engaging faces of the members 2 and 3 together, the cup-washer 15 with its ring 16 or cup 16ª is placed in the recess 13 located in the coupling member 2. The connecting ring 4 is then screwed upon the coupling member 2 to draw the faces of the couplings together and to slightly compress the disk or bottom portion of the washer 15 between the ring 13 and projection 14, the coupling ring 4 being turned by means of a wrench in the usual manner.

When it is desired to separate the members the coupling ring 4 is turned in the proper direction to unscrew itself from the member 3 and by this operation the joint is broken. The cup-washer 15 having been expanded in the bottom portion of the recess 13 by the action of the fluid pressure on the pipe line, will remain in place in this recess owing to the smaller diameter of the outlet of this opening. The parts may be connected and disconnected any number of times without damage to the coupling and, by reason of the cup-washer, will always maintain a tight joint when the pressure is applied to the piping.

Modifications in the construction and arrangement of the parts may be made without departing from my invention. The recess 13 may be made with straight sides instead of being counterbored as shown and other changes may be made.

I claim:—

1. A pipe coupling, comprising coupling members having opposing surfaces contacting with each other, one of said members having a centrally located recess, a cup-shaped washer in said recess, and a coupling ring to draw and hold the opposing faces in close contact with each other, and to compress the bottom of the cup-shaped washer; substantially as described.

2. A pipe coupling comprising coupling members having opposing surfaces contacting with each other, one of said surfaces having a recess therein, said recess being counter-bored to a larger diameter at its inner end, a coupling member adapted to draw and hold the opposing surfaces in close contact, and a compressible cup-washer located in said recess and arranged to be expanded in the counter-bore of said recess by fluid pressure; substantially as described.

3. A pipe coupling comprising coupling members having opposing surfaces contacting with each other, one of said surfaces having a recess therein, said recess being counter-bored to a larger diameter at its inner end, a coupling member adapted to draw and hold the opposing surfaces in close contact, a compressible cup-washer located in said recess and arranged to be expanded in the counter-bore of said recess by fluid pressure, and a second washer in said cup-washer adapted to hold the cup-washer in position and prevent its collapsing under fluid pressure; substantially as described.

4. A pipe coupling comprising coupling members having opposing surfaces contacting with each other, one of said members having a centrally located annular recess, the other member having a centrally located annular boss projecting into said recess, a cup shaped washer in said recess, and a coupling ring to draw and hold the opposing faces in close contact with each other and to compress the bottom of the cup shaped washer; substantially as described.

In testimony whereof, I have hereunto set my hand.

MATHEW F. KELLY.

Witnesses:
SCOTT M. STEWART,
D. P. THOMAS.